United States Patent Office

3,359,288
Patented Dec. 19, 1967

3,359,288
NOVEL 6-FLUORO-Δ⁶-STEROIDS
AND PROCESSES
Meyer Sletzinger, North Plainfield, N.J., assignor to
Merck & Co., Inc., Rahway, N.J., a corporation of
New Jersey
No Drawing. Filed Mar. 13, 1961, Ser. No. 95,006
7 Claims. (Cl. 260—397.45)

This invention relates to new steroid compounds of the pregnane series. More particularly it relates to 6α-fluoro-16-methyl pregnadienes and pregnatrienes which are oxygenated at the 3,11 and 17 positions of the steroid ring system, their 9-halo derivatives, and the 21-esters and 21-desoxy derivatives therof. Still more particularly, it is concerned with new compounds of the general structural formula

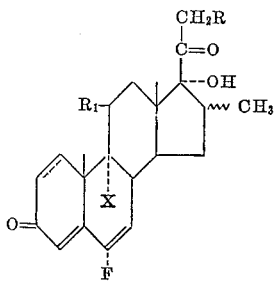

It is further concerned with the processes and intermediate porducts used to prepare such compounds.

This application is a continuation-in-part of co-pending application Ser. No. 746,661 filed July 7, 1958.

The steroid substances defined by this general formula, where R is hydrogen, hydroxy, or acyloxy, $R_1$ is a hydroxy or keto group, X is hydrogen or fluorine and the dotted line between the C1–C2 carbon atom signifies a single or a double bond, have an unusually high degree of anti-inflammatory activity without the undesirable side effects associated with anti-inflammatory steroids commercially available at the present time.

It is an object of the invention to provide such 6α-fluoro-16-methyl steroid compounds. It is also an object to provide methods for making them and to provide other new steroids which are useful as intermediates in such syntheses. These and other objects will be apparent from the following discussion:

The process of the invention comprises dehydrogenating 17α,21-dihydroxy-6-fluoro-16-methyl-11 - oxygenated-4-pregnene-3,20-dione 21-esters, 17α,21 - dihydroxy - 6-fluoro-16-methyl-11-oxygenated-4,6 - pregnadiene - 3,20-dione 21-esters, and 9-halo derivatives thereof, to produce the 4,6-pregnadiene and 1,4,6-pregnatriene 21-esters respectively, thereafter converting these compounds to their 21-desoxy derivatives. The dehydrogenation of the 17α,21-dihydroxy-6-fluoro-16-methyl-11-oxygenated-4 - pregnene-3,20-dione starting material is accomplished by treating a 17α,21-dihydroxy-6-fluoro-16-methyl-11 - oxygenated - 4-pregnene-3,20-dione 21-ester with chloranil, to obtain the corresponding 17α,21-dihydroxy-6-fluoro-16-methyl - 11-oxygenated-4,6-pregnadiene-3,20-dione 21-ester. The dehydrogenation of the thus-obtained 4,6-pregnadiene is accomplished with selenium dioxide to yield the 11-oxygenated-17α,21-dihydroxy-6-fluoro-16-methyl-1,4,6 - pregnatriene-3,20-dione 21-ester. These 21-esters are subjected to mild alkaline hydrolysis to form the 21-free alcohols, and are reacted with a lower alkane sulfonyl halide thereby forming the 21-lower alkane sulfonate of 17α,21-dihydroxy-6-fluoro-16-methyl-11-oxygenated-4,6-pregnadiene-3,20-diones and 17α,21-dihydroxy-6-fluoro-16-methyl-11-oxygenated-1,4,6-pregnatriene-3,20 - diones, and 9 - halo derivatives thereof; these 21-lower alkane sulfonate compounds are reacted with an alkali metal iodide thereby forming 21-iodo-17α-hydroxy-6-fluoro-16-methyl-11 - oxygenated-4,6-pregnadiene-3,20-diones, 21-iodo - 17α - hydroxy-6-fluoro-16-methyl-11-oxygenated - 1,4,6 - pregnatriene-3,20-diones, and 9-halo derivatives thereof, which upon reaction with a reducing agent are converted to the corresponding 17α-hydroxy-6-fluoro-16-methyl-11 - oxygenated-4,6-pregnadiene-3,20-diones, 17α - hydroxy - 6-fluoro-16-methyl-11-oxygenated-1,4,6-pregnatriene - 3,20-diones, and 9-halo derivatives thereof.

The chloranil dehydrogenation of this invention is conducted using the 21-ester of the starting material to prevent extensive degradation of the dihydroxy-acetone side chain. The reaction is conveniently carried out by bringing the reactants together in a solvent medium such as a lower alkanoyl ester, alcohols, organic acids or mixtures of esters and acids. Typical examples of such solvents are ethyl acetate, propyl acetate, ethyl alcohol, t-butyl alcohol, acetic acid or mixtures of ethyl acetate and acetic acid, and the like. In one method for producing the compounds of our invention the 21-acetate of 11β,17α,21-trihydroxy-6α-fluoro-16α-methyl-4-pregnene-3,20-dione is suspended in ethyl acetate and acetic acid and mixed with approximately twice its weight of chloranil. The suspension is heated at the reflux temperature under nitrogen for a period of from about 15 to 20 hours to form the corresponding 21-acetate of 11β,17α,21-trihydroxy-6-fluoro - 16α-methyl-4,6-pregnadiene-3,20-dione. The resulting product is conveniently recovered by extraction with an organic solvent followed by chromatography over activated alumina.

In similar manner, the 21-acetate of the corresponding 11-keto compound, 17α,21-dihydroxy-6α-fluoro-16α-methyl-4-pregnene-3,11,20-trione 21-acetate is converted to 17α,21-dihydroxy-6-fluoro-16α-methyl-4,6-pregnadiene-3,11,20-trione 21-acetate. In an alternate method of preparing the 11-keto-compound the corresponding 11-hydroxy-compound is oxidized with a solution of chromium trioxide in acetic acid. Thus, when 11β,17α,21-trihydroxy-6-fluoro-16α-methyl-4,6-pregnadiene-3,20-dione 21-acetate is contacted with a solution of chromium trioxide in acetic acid there is formed 17α,21-dihydroxy-6 - fluoro - 16α-methyl-4,6-pregnatriene-3,11,20-trione 21-acetate.

The selenium dioxide dehydrogenation procedure is conveniently conducted by bringing the 17α,21-dihydroxy-6 - fluoro - 16-methyl - 11-oxygenated-4,6-pregnadiene-3,20-dione 21-ester, and selenium dioxide together in the presence of an organic solvent such as, for example, dioxane, an alcohol solvent such as t-butanol, etc., and heating the mixture at an elevated temperature. It has been found desirable in conducting this reaction, to have mercury present in the reaction mixture in small amounts, preferably one or two drops, in order to suppress the formation of unwanted by-products. When t-butanol is used as the solvent, it is ordinarily preferred to carry out this reaction at the boiling point of the solvent, under which conditions the reaction is ordinarily complete in about fifteen hours. The reaction mixture is ordinarily filtered, thereby removing metalic selenium, and the filtered solution is evaporated to dryness in vacuo to give the desired 17α,21-dihydroxy-6-fluoro-16-methyl-11-oxygenated-1,4,6-pregnatriene-3,20-dione 21-ester, such as, for example, 11β,17α,21-trihydroxy-6-fluoro-16α-methyl-1,4,6 - pregnatriene-3,20-dione 21-acetate, 17α,21-dihydroxy - 6 - fluoro-16β-methyl-1,4,6-pregnatriene-3,11,20-trione 21-acetate, and the like. The crude material obtained in this way is conveniently purified by paper strip chromatography, or if desired, by chromatography using silica gel, activated alumina, and the like. After separation of the dehydrogenated product from unreacted starting material, the product can be purified further, if desired, by recrystallization from a solvent such as ethyl acetate, ethyl acetate-petroleum ether, and the like.

The starting materials which are employed in the process of our invention are 17α,21-dihydroxy-6-fluoro-16-methyl - 11 - oxygenated-4-pregnene-3,20-dione 21-acylates, and their 9α-halo derivatives, as for example 17α,21-dihydroxy - 6α - fluoro-16α-methyl-4-pregnene-3,11,20-trione 21-acetate, 11β,17α,21-trihydroxy-6α-fluoro-16β-methyl - 4 - pregnene-3,20-dione 21-tertiary butyl acetate, 6α,9α - difluoro - 11β,17α,21 - trihydroxy-16α-methyl-4-pregnene-3,20-dione 21-acetate and the like, and are prepared in accordance with the disclosure in copending applications Ser. Nos. 746,661 and 746,662, now abandoned, both filed July 7, 1958. Other 21-acylates, more particularly the 21-lower hydrocarbon acylate such as the 21-benzoate, and other 21-lower alkanoates, such as the 21-propionate, 21-tertiary butyl acetate, and the like may likewise be employed. These 21-propionates and 21-benzoates, as well as the above-mentioned tertiary butyl acetates and other esters, are readily prepared from the corresponding 21-free alcohol corresponding to the above-mentioned 21-acetates by reaction with the appropriate alkanoyl chloride, as for example, propionyl chloride, benzoyl chloride or tertiary butyl acetyl chloride in the presence of a tertiary amine base such as pyridine.

When the above enumerated starting materials are subjected to the above dehydrogenation procedures the corresponding 17α,21 - dihydroxy-6-fluoro-16-methyl-11-oxygenated - 4,6-pregnadiene-3,20-dione and 1,4,6-pregnatriene compounds are formed, which include 17α,21-dihydroxy - 6 - fluoro-16α-methyl-4,6-pregnadiene-3,11,20-trione 21 - acetate, 11β,17α,21-trihydroxy-6-fluoro-16α-methyl - 4,6-pregnadiene-3,20-dione 21-acetate, 6,9α-difluoro - 11β,17α,21 - trihydroxy-16β-methyl-4,6-pregnadiene - 3,20 - dione 21-propionate, 17α,21-dihydroxy-6-fluoro - 16α - methyl-1,4,6-pregnatriene-3,11,20-trione 21-tertiary butyl acetate, 11β,17α,21-trihydroxy-6-fluoro-16β-methyl - 1,4,6 - pregnatriene-3,20-dione 21-acetate, 6,9α-difluoro - 17α,21 - dihydroxy-16α-methyl-1,4,6-pregnatriene - 3,11,20 - trione 21-acetate, and the like. These esters may be converted by treatment with potassium bicarbonate in aqueous methanol to produce the 21-hydroxy compounds corresponding to the above enumerated 21-esters.

This invention also contemplates the 21-desoxy derivatives of 17α,21-dihydroxy-6-fluoro-16-methyl-11-oxygenated 4,6-pregnadiene-3,20-dione and 17α,21-dihydroxy-6-fluoro - 16-methyl-11-oxygenated-1,4,6-pregnatriene-3,20-dione compounds, namely, 17α-hydroxy-6-fluoro-16-methyl-11-oxygenated-4,6-pregnadiene-3,20-diones and 17α-hydroxy - 6-fluoro-16-methyl-11-oxygenated-1,4,6-pregnatriene-3,20-diones, and 9-halo derivatives thereof, and processes for preparing these compounds.

In carrying out the process for preparing these 21-desoxy derivatives, a lower alkane sulfonyl halide, such as methane-sulfonyl chloride, is reacted with 17α,21-dihydroxy - 6 - fluoro-16-methyl-11-oxygenated-4,6-pregnadiene - 3,20-dione, 17α,21-dihydroxy-6-fluoro-16-methyl-11 - oxygenated - 1,4,6-pregnatriene-3,20-dione, and their 9-halo derivatives. The reaction is conveniently conducted by bringing the reactants together in solution in a tertiary amine such as pyridine and preferably at a temperature of about 0–5° C., under which conditions the reaction is ordinarily complete in approximately one hour. The reaction mixture is diluted with water, and the material which precipitates is recovered and dried to give the corresponding 17α,21 - dihydroxy-6-fluoro-16-methyl-11-oxygenated-4,6-pregnadiene-3,20-dione 21-methane sulfonate, 17α,21-dihydroxy - 6-fluoro-16-methyl-11-oxygenated-1,4,6-pregnatriene-3,20-dione 21-methane sulfonate, and 9-halo derivatives thereof.

The reaction between the alkali metal iodide such as sodium iodide and 17α,21-dihydroxy-6-fluoro-16-methyl-11 - oxygenated - 4,6-pregnadiene-3,20-dione 21-methane sulfonate, 17α,21 - dihydroxy - 6-fluoro-16-methyl-11-oxygenated - 1,4,6 - pregnatriene-3,20-dione 21-methane sulfonate, and 9-halo derivatives thereof, is conveniently conducted by bringing the reactants together in an organic solvent medium, for example, an aliphatic ketone such as acetone, and heating the resulting mixture at a temperature of approximately 50–60° C., under which conditions the reaction is ordinarily complete in approximately one hour. The reaction mixture is cooled, diluted with water, and the material which precipitates is recovered and dried to give the corresponding 21-iodo-17α-hydroxy - 6 - fluoro-16-methyl-11-oxygenated-4,6-pregnadiene-3,20-dione, 21 - iodo-17α-hydroxy-6-fluoro-16-methyl - 11 - oxygenated-1,4,6-pregnatriene-3,20-dione, and 9-halo derivatives thereof.

The above-mentioned 21-iodo-steroid is then reacted with a reducing agent as, for example, hydrogen in the presence of a hydrogenation catalyst such as platinum, nickel, palladium and oxides of these metals, chromous chloride, alkali metal bisulfite, and the like. When hydrogen is used as the reducing agent, the hydrogenation reaction is ordinarily conducted in a solvent such as an alcohol, for example, ethanol, methanol or propanol. The reaction is carried out at a temperature in the range of 0° C. to 100° C., preferably at room temperature, until one mole of hydrogen is taken up, thereby forming the corresponding 21-desoxy steroid compound. Alternatively, the 21-iodo-steroid is reacted in an organic solvent such as dioxane with aqueous chromous chloride, preferably in an inert atmosphere while maintaining the reaction mixture at substantially room temperature. The reduction is also conveniently carried out by reacting the 21-iodo-steroid with an alkali bisulfite in an aqueous organic solvent solution, for example, aqueous ethanol, and preferably at an elevated temperature. The reduced product, the 21-desoxy steroid, is conveniently recovered by diluting the reaction mixture with water and extracting the 21-desoxy steroid from the equeous mixture with an organic solvent such as chloroform. The chloroform extracts are washed with water, aqueous alkaline solution, dried and the chloroform solution evaporated to give the 21-desoxy steroid, the 17α - hydroxy - 6 - fluoro - 16 - methyl-11-oxygenated-4,6-pregnadiene-3,20-dione, 17α-hydroxy-6-fluoro-16-methyl-11-oxygenated-1,4,6-pregnatriene-3,20-dione, and 9-halo derivatives thereof, for example, 17α-hydroxy-6-fluoro-16α-methyl-4,6-pregnadiene-3,11,20-trione, 11β,17α-dihydroxy - 6 - fluoro - 16β - methyl - 1,4,6 - pregnatriene-3,20-dione - 6,9α - difluoro-17α-hydroxy-6-fluoro-16α-methyl-4,6-pregnadiene-3,11,20-trione, and the like.

Alternatively, the 21 - iodo - 17α - hydroxy-6-fluoro-16-methyl - 11 - oxygenated-4,6-pregnadiene-3,20-dione and 1,4,6-pregnatriene compounds and 9-halo derivatives thereof may be reacted with a phosphorylating agent to produce the corresponding 21-phosphate ester. An inorganic phosphate, as, for example, silver dihydrogen phosphate, or an organic phosphate, preferably a bis-aralkyl ortho-phosphate such as dibenzyl ortho-phosphate and the like, may be employed as the phosphorylating agents. When the latter is employed the reaction is conveniently carried out by bringing together, in an organic solvent for the reactants such as benzene, toluene, xylene or dioxane, a salt of the bis-aralkyl ortho-phosphate and the 21-iodo-17α - hydroxy - 6 - fluoro - 16 - methyl-11-oxygenated- 4,6-pregnadiene-3,20-dione or the corresponding 1,4,6-pregnatriene compound. As the salt of the organic phosphate, it is preferred to use a salt, the cation of which forms insoluble iodides in the organic solvent employed for the reaction, such as silver dibenzyl ortho-phosphate, sodium dibenzyl ortho-phosphate, potassium dibenzyl ortho-phosphate, barium dibenzyl ortho-phosphate, calcium dibenzyl ortho-phosphate, and the like. The reaction is conveniently carried out at the reflux temperature of the solvent, under which conditions reaction is ordinarily complete in about 4 to 26 hours.

Alternatively, if silver dihydrogen phosphate is employed as the phosphorylating agent the reaction is carried out by bringing together the 21-iodo steroid with a silver phosphate-phosphoric acid mixture preferably containing about two moles of phosphoric acid per mole of yellow trisilver phosphate. A slight excess of phosphoric acid over this amount is advantageous although an insufficiency is operable. Concentrated phosphoric acid, for example, either 85% or 100%, is preferred as a source of phosphoric acid. This mixture of silver phosphate and phosphoric acid may behave as the equivalent of silver dihydrogen phosphate, $AgH_2PO^4$, in the reaction of the present invention. The silver phosphate-phosphoric acid and 21-iodo steroid reagent may be mixed substantially simultaneously at the onset of the reaction. It is also permissible to premix the silver phosphate and phosphoric acid. In practice it is preferable to mix intimately finely divided silver phosphate and the phosphoric acid so as to obtain a good dispersion. The reaction between the 12-iodo steroid and the silver dihydrogen phosphate is conveniently carried out in an inert organic solvent medium. Acetonitrile has been found to be a particularly advantageous solvent, although various other solvents such as diethyl ether, 1,4-dioxane, tetrahydrofuran, acetone, and dimethyl sulfone may also be used. The reaction temperature and time are not critical, although, of course, the reaction time is speeded as the temperature is increased. The reaction may be carried out advantageously at reflux temperature. The reaction time may vary widely. When carrying out the reaction in acetonitrile at reflux temperature, for example, a reaction time of 1¼ hours has been found sufficient, and three hours has also been found satisfactory. Shorter and longer reaction times are also permissible.

At the conclusion of the above reactions with either the organic or inorganic phosphorylating agents, the 21-phosphate derivative is recovered, either as the free acid, i.e., the dihydrogen phosphate acid ester, or as the corresponding mono or dialkali metal salt. Various procedures may be used for recovery. One procedure which has been found quite desirable is to dilute the reaction products with water, remove the organic solvent by vacuum distillation, and thereafter treat the remaining aqueous solution to recover the desired phosphate compound. This may be done, for example, by raising the pH to within the range of 4 to 11, preferably 6 to 10, by the addition of either an alkali metal base such as sodium hydroxide or an alkali metal carbonate such as sodium carbonate. This converts the steroid dihydrogen phosphate acid ester to the corresponding alkali metal salt, and at the same time precipitates excess silver as trisilver phosphate. The insoluble material may be removed by filtration. The steroid phosphate salt may be recovered from aqueous solution by freeze drying and extraction of the anhydrous solid material which remains with a suitable organic solvent such as dry methanol. The methanolic extract of the 21-phosphate salt may then be obtained as the free acid by acidification with a strong mineral acid or preferably by contact with a cation exchange resin in its hydrogen form. The use of an ion exchange resin is preferable to the use of common mineral acids so as to avoid contamination by inorganic salts. The 21-phosphate free acid is eluted and, if desired, concentrated, and then precipitated by the addition of a suitable non-polar liquid, such as diethyl ether or ethyl acetate. The resulting 21-dihydrogen phosphate may be used as such in pharmaceutical formulations, or may be converted to desired salts. Suitable neutralizing agents include sodium hydroxide, sodium methoxide, sodium carbonate, potassium hydroxide, ammonium hydroxide, calcium hydroxide, barium hydroxide and the like. The steroid monosodium phosphates can be formed by neutralization of the free acid to a pH less than 7, and the disodium phosphates can be formed by neutralization to a pH greater than 7, preferably 9 to 10.

The following examples illustrate methods of carrying out the present invention, but it is to be understood that these examples are given for purposes of illustration and not of limitation.

EXAMPLE 1

A suspension containing 150 mg. of 17α,21-dihydroxy-6α - fluoro - 16α - methyl - 4 - pregnene-3,11,20-trione 21-acetate, 350 mg. of chloranil, 4.2 ml. of ethyl acetate and 0.9 ml. of acetic acid is refluxed for 17 hours under nitrogen. The reaction mixture is diluted with 20 ml. of ethyl acetate and filtered. The filtrate is washed sequentially with two 10 ml. portions of ice cold 10% aqueous sodium bisulfite solution, three 10 ml. portions of ice cold 5% aqueous potassium hydroxide solution and finally washed to neutrality with several 10 ml. portions of ice water. The aqueous washes are re-extracted with 25 ml. of ethyl acetate and treated as above. The combined organic phase is dried over sodium sulfate and concentrated in vacuo. The crude material dissolved in benzene is chromatographed on 7.5 g. of acid washed alumina. Elution with chloroform:ether 2:8 affords 17α,21-dihydroxy - 6 - fluoro - 16α - methyl - 4,6 - pregnadiene-3,11,20-trione 21-acetate. This product is then hydrolyzed by treatment with a solution of potassium bicarbonate in aqueous methanol to form 17α,21 - dihydroxy - 6 - fluoro-16α-methyl-4,6-pregnadiene-3,11,20-trione.

In accordance with the above procedure but starting with 17α,21 - dihydroxy - 6α - fluoro - 16β - methyl-4-pregnene - 3,11,20-trione 21-acetate there are obtained 17α,21 - dihydroxy - 6 - fluoro - 16β - methyl - 4,6-pregnadiene-3,11,20-trione and its 21-acetate.

EXAMPLE 2

A suspension containing 150 mg. of 11β,17α,21 - trihydroxy - 6α - fluoro - 16α - methyl - 4 - pregnene-3,20-dione 21-acetate, 350 mg. of chloranil, 4.2 ml. of ethyl acetate and 0.9 ml. of acetic acid is refluxed for 17 hours under nitrogen. The reaction mixture is diluted with 20 ml. of ethyl acetate and filtered. The filtrate is washed sequentially with two 10 ml. portions of ice cold 10% aqueous sodium bisulfite solution, three 10 ml. portions of ice cold 5% aqueous potassium hydroxide solution and finally washed to neutrality with several 10 ml. portions of ice water. The aqueous washes are re-extracted with 25 ml. of ethyl acetate and treated as above. The combined organic phase is dried over sodium sulfate and concentrated in vacuo. The crude material dissolved in benzene is chromatographed on 75 g. of acid washed alumina. Elution with chloroform:ether 2:8 affords 11β,17α,21 - trihydroxy - 6 - fluoro - 16α - methyl-4,6-pregnadiene-3,20-dione 21-acetate. This product is then hydrolyzed by treatment with a solution of potassium bicarbonate in aqueous methanol to form 11β,17α,21-trihydroxy - 6 - fluoro - 16α - methyl - 4,6-pregnadiene-3,20-dione.

In accordance with the above procedure but starting with 11β,17α,21 - trihydroxy - 6α - fluoro - 16β - methyl-4-pregnene - 3,20 - dione 21-acetate there are obtained 11β,17α,21 - trihydroxy - 6 - fluoro - 16β - methyl-4,6-pregnadiene-3,20-dione and its 21-acetate.

EXAMPLE 3

A suspension containing 150 mg. of 6α,9α-difluoro-11β,-17α,21-trihydroxy-16α-methyl-4-pregnane-3,20 - dione 21-acetate, 350 mg. of chloranil, 4.2 ml. of ethyl acetate and 0.9 ml. of acetic acid is refluxed for 17 hours under nitrogen. The reaction mixture is diluted with 20 ml. of ethyl acetate and filtered. The filtrate is washed sequentially with two 10 ml. portions of ice cold 10% aqueous sodium bisulfite solution, three 10 ml. portions of ice cold 10% aqueous sodium bisulfite solution, three 10 ml. portions of ice cold 5% aqueous potassium hydroxide solution and finally washed to neutrality with several 10 ml. portions of ice water. The aqueous washes are re-extracted with 25 ml. of ethyl acetate and treated as above. The combined organic phase is dried over sodium sulfate and concentrated in vacuo. The crude material dissolved in benzene is chromatographed on 7.5 g. of acid washed alumina. Elution with chloroform:ether 2:8 affords 6,9α-difluoro-11β,17α,21-trihydroxy-16α-methyl-4,6-pregnadiene-3,20-dione 21-acetate. This product is then hydrolyzed by treatment with a solution of potassium bicarbonate in aqueous methanol to form 6,9α-difluoro-11β,17α,21-trihydroxy-16α-methyl-4,6-pregnadiene - 3,20-dione.

Similarly, in accordance with the above procedure but starting with 6α,9α-difluoro-11β,17α,21-trihydroxy-16β-methyl-4-pregnene-3,20-dione 21-acetate, there is obtained the corresponding 6,9α-difluoro-11β,17α,21-trihydroxy-16β-methyl-4,6-pregnadiene-3,20-dione and its 21-acetate.

EXAMPLE 4

A suspension containing 150 mg. of 6α,9α-difluoro-17α,21 - dihydroxy-16α-methyl-4-pregnene-3,11,20-trione 21-acetate, 350 mg. of chloranil, 4.2 ml. of ethyl acetate and 0.9 ml. of acetic acid is refluxed for 17 hours under nitrogen. The reaction mixture is diluted with 20 ml. of ethyl acetate and filtered. The filtrate is washed sequentially with two 10 ml. portions of ice cold 10% aqueous sodium bisulfite solution, three 10 ml. portions of ice cold 5% aqueous potassium hydroxide solution and finally washed to neutrality with several 10 ml. portions of ice water. The aqueous washes are re-extracted with 25 ml. of ethyl acetate and treated as above. The combined organic phase is dried over sodium sulfate and concentrated in vacuo. The crude material dissolved in benzene is chromatographed on 7.5 g. of acid washed alumina. Elution with chloroform:ether 2:8 affords 6,9α-difluoro-17α,21-dihydroxy-16α-methyl-4,6-pregnadiene-3,11,20 - trione 21-acetate. This product is then hydrolyzed by treatment with a solution of potassium bicarbonate in aqueous methanol to form 6,9α - difluoro - 17α,21-dihydroxy-16α-methyl-4,6-pregnadiene-3,11,20-trione.

EXAMPLE 5

To a solution of 100 mg. of 17α,21-dihydroxy-6-fluoro-16α-methyl-4,6-pregnadiene-3,11,20-trione 21-acetate in 0.10 ml. of acetic acid and 6 ml. of t-amyl alcohol is added 60 mg. of selenium dioxide and 1 drop of mercury. The mixture is refluxed under nitrogen overnight. The solution is filtered, washed with sodium bicarbonate, dried, and concentrated. This product is chromatographed on acid washed alumina. The adsorbate is eluted with mixtures of chloroform and ether, increasingly rich in chloroform. The eluates are combined, evaporated to dryness and the residual material recrystallized from ethyl acetate to give 17α,21-dihydroxy-6-fluoro-16α-methyl-1,4,6-pregnatriene-3,11,20-trione 21-acetate. This product is then hydrolyzed by treatment with a solution of potassium bicarbonate in aqueous methanol to form 17α,21-dihydroxy-6-fluoro-16α-methyl-1,4-6-pregnatriene-3,11,20-trione.

In accordance with the above procedure but starting with 17α,21 - dihydroxy-6-fluoro-16β-methyl-4,6-pregnadiene-3,11,20-trione 21-acetate there are obtained 17α,21-dihydroxy-6-fluoro-16β-methyl - 1,4,6 - pregnatriene-3,11,20-trione and its 21-acetate.

EXAMPLE 6

To a solution of 100 mg. of 11β,17α,21-trihydroxy-6-fluoro-16α-methyl-4,6-pregnadiene-3,20 - dione 21-acetate in 0.10 ml. of acetic acid and 6 ml. of t-amyl alcohol is added 60 mg. of selenium dioxide and 1 drop of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 11β,17α,21-trihydroxy-6-fluoro-16α-methyl-1,4,6-pregnatriene-3,20-dione 21-acetate. This product is then hydrolyzed by treatment with a solution of potassium bicarbonate in aqueous methanol to form 11β,17α,21-trihydroxy-6-fluoro-16α-methyl-1,4,6-pregnatriene - 3,20-dione.

In accordance with the above procedure but starting with 11β,17α,21-trihydroxy-6-fluoro-16β-methyl-4,6-pregnadiene-3,20-dione 21-acetate there are obtained 11β,17α,-21-trihydroxy-6-fluoro-16β-methyl-1,4,6-pregnatriene - 3,-20-dione and its 21-acetate.

EXAMPLE 7

To a solution of 100 mg. of 6,9α-difluoro-11β,17α,21-trihydroxy-16α-methyl-4,6-pregnadiene-3,20-dione 21-acetate in 0.10 ml. of acetic acid and 6 ml. of t-amyl alcohol is added 6.0 mg. of selenium dioxide and 1 drop of mercury. The mixture is refluxed under nitrogen overnight. The solution is filtered, washed with sodium bicarbonate, dried and concentrated. This product is chromatographed on acid washed alumina. The adsorbate is eluted with mixtures of chloroform and ether, increasingly rich in chloroform. The eluates are combined, evaporated to dryness and the residual material recrystallized from ethyl acetate to give 6,9α-difluoro-11β,17α,21-trihydroxy-16α-methyl-1,4,6-pregnatriene-3,20-dione 21-acetate. This product is then hydrolyzed by treatment with a solution of potassium bicarbonate in aqueous methanol to form 6,9α-difluoro-11β,17α,21-trihydroxy-16α-methyl-1,4,6-pregnatriene - 3,-20-dione.

In accordance with the above procedure but starting with 6,9α-difluoro-11β,17α,21-trihydroxy-16β-methyl-4,6-pregnadiene-3,20-dione 21-acetate there are obtained 6,9α-difluoro - 11β,17α,21 - trihydroxy - 16β - methyl - 1,4,6-pregnatriene-3,20-dione and its 21-acetate.

EXAMPLE 8

To a solution of 100 mg. of 6,9α-difluoro-17α,21-dihydroxy - 16α - methyl-4,6-pregnadiene-3,11,20-trione 21-acetate in 0.10 ml. of acetic acid and 6 ml. of t-amyl alcohol is added 60 mg. of selenium dioxide and 1 drop of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 6,9α-difluoro-17α,21-dihydroxy - 16α - methyl - 1,4,6-pregnatriene-3,11,20-trione 21-acetate. This product is then hydrolyzed by treatment with a solution of potassium bicarbonate in aqueous methanol to form, 6,9α-difluoro-17α,21-dihydroxy-16α-methyl-1,4,6-pregnatriene-3,11,20-trione.

In accordance with the above procedure, but starting with 6,9α - difluoro - 17α,21 - dihydroxy-16β-methyl-4,6-pregnadiene-3,11-20-trione 21-acetate there are obtained 6,9α - difluoro - 17α,21 - dihydroxy-16β-methyl-1,4,6-pregnatriene-3,11,20-trione and its 21-acetate.

EXAMPLE 9

To a solution of 43 mg. of 17α,21dihydroxy-6-fluoro-16α-methyl-4,6-pregnadiene-3,11,20-trione, in 0.3 ml. of pyridine, cooled to 0° C., is added 0.02 ml. of methanesulfonyl chloride. The resulting mixture is allowed to stand at a temperature of approximately 0° C. for a period af approximately 1 hour. Water is then added to the reaction mixture and the crystalline precipitate which forms is recovered, washed with water, and dried to give 17α,21-dihydroxy - 6 - fluoro - 16α - methyl - 4,6 - pregnadiene-3,11,20-trione 21-methane sulfonate.

To 90 mg. of 17α,21-dihydroxy-6-fluoro-16α-methyl-4,6-pregnadiene-3,11,20-trione 21-methane sulfonate dissolved in 5 ml. of actone is added 150 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α - hydroxy - 6 - fluoro - 16α-methyl-4,6-pregnadiene-3,11,20-trione.

This 21 - iodo - 17α-hydroxy-6-fluoro-16α-methyl-4,6-pregnadiene-3,11,20-trione is dissolved in a mixture of 2.5 ml. of water and 2.5 ml. of ethanol. To the resulting suspension is added 250 mg. of sodium bisulfite and the mixture is heated under reflux for a period of about 1 hour. The reaction solution is cooled, diluted with water, and the crystalline material which separates is recovered, washed with water, dried and recrytallized from ethyl acetate to give 17α-hydroxy-6-fluoro-16α-methyl-4,6-pregnadiene-3,11,20-trione.

In accordance with the above procedures but starting with 17α,21 - dihydroxy - 6-fluoro - 16β - methyl-4,6-pregnadiene-3,11,20-trione there is obtained, following the reaction with methane-sulfonyl chloride, 17α,21-dihydroxy - 6 - fluoro-16β-methyl-4.6-pregnadiene-3,11,20-trione 21-methane sulfonate which upon reaction with sodium iodide in acetone is converted to 21-iodo-17α-hydroxy - 6 - fluoro - 16β-methyl-4,6-pregnadiene-3,11,20-trione, which upon reaction with sodium bisulfite is converted to 17α - hydroxy - 6 - fluoro - 16β - methyl - 4,6-pregnadiene-3,11,20-trione.

EXAMPLE 10

To a solution of 43 mg. of 11β,17α,21-trihydroxy-6-fluoro-16α-methyl-4,6-pregnadiene-3,20-dione in 0.3 ml. of pyridine, cooled to 0° C., is added 0.02 ml. of methanesulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 11β,17α - 21 - trihydroxy-6-fluoro - 16α - methyl - 4,6-pregnadiene-3,20-dione 21-methane sulfonate.

To 90 mg. of 11β,17α,21-trihydroxy-6-fluoro-16α-methyl-4,6-pregnadiene-3,20-dione 21-methane sulfonate dissolved in 5 ml. of acetone is added 150 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo - 11β,17α - dihydroxy - 6 - fluoro-16α-methyl-4,6-pregnadiene-3,20-dione.

160 mg. of trisilver phosphate are thoroughly mixed with 0.1 ml. of 100% phosphoric acid, and the silver dihydrogen phosphate thus obtained is washed by decantation with two portions of diethyl ether to remove unreacted phosphoric acid. Approximately 1.0 ml. of acetonitrile are added, and the mixture is heated to reflux temperature. To the resulting mixture are then added 21-iodo-11β,17α-dihydroxy - 6 - fluoro - 16α-methyl-4,6-pregnadiene-3,20-dione, and the mixture is heated under reflux in a nitrogen atmosphere with stirring for a period of approximately 75 minutes. The reaction mixture is cooled to room temperature, about 1.0 g. of ice water is added, and the acetonitrile is evaporated in vacuo at a temperature below about 25° C. The pH of the resulting aqueous suspension is adjusted to 6.4 by the addition of 0.12 ml. of saturated aqueous sodium carbonate solution. The precipitate, which forms, is removed by filtration and washed thoroughly with water. The filtered aqueous solution and washes are combined, and dried from the frozen state, and the residual material is triturated with seven 0.5 ml. portions of methanol. The methanol-insoluble material is separated by filtration, the filtered methanolic solution is evaporated in vacuo to a volume of approximately 0.1 ml., and 1.0 ml. of ether are added to the concentrated methanolic solution. The material which precipitates is recovered, washed with ether, and dried to give 11β,17α,21-trihydroxy - 6 - fluoro - 16α - methyl-4,6-pregnadiene-3,20-dione 21-dihydrogen phosphate.

In accordance with the above procedures but starting with 11β,17α,21 - trihydroxy - 6 - fluoro - 16β - methyl-4,6 - pregnadiene - 3,20 - dione there is obtained, following the reaction with methanesulfonyl chloride, 11β,17α, 21 - trihydroxy - 6 - fluoro - 16β - methyl - 4,6 - pregnadiene - 3,20 - dione 21 - methane sulfonate, which upon reaction with sodium iodide in acetone is converted to 21 - iodo - 11β,17α - dihydroxy - 6 - fluoro - 16β - methyl-4,6 - pregnadiene - 3,20 - dione, which, upon reaction with a mixture of silver phosphate and phosphoric acid, is converted to 11β,17α - dihydroxy - 6 - fluoro - 16β - methyl - 4,6 - pregnadiene - 3,20 - dione 21 - dihydrogen phosphate.

Various changes and modifications may be made in the present invention, certain preferred embodiments of which are herein disclosed, without departing from the scope thereof; to the extent that these changes and modifications are within the scope of the appended claims, they are to be considered a part of this invention.

I claim:

1. 11β,17α,21 - trihydroxy - 6 - fluoro - 16α - methyl - 4,6-pregnadiene-3,20-dione.
2. 11β,17α,21 - trihydroxy - 6 - fluoro - 16α - methyl - 4,6 - pregnadiene - 3,20 - dione 21 - phosphate.
3. 11β,17α,21 - trihydroxy - 6 - fluoro - 16α - methyl - 4,6 - pregnadiene - 3,20 - dione 21 - phosphate.
4. 11β,17α,21 - trihydroxy - 6 - fluoro - 16α - methyl - 4,6 - pregnadiene - 3,20 - dione 21 - (tertiary butyl acetate).
5. 11β,17α,21 - trihydroxy - 6 - fluoro - 16α - methyl - 1,4,6 - pregnatriene - 3,20 - dione.
6. 11β,17α,21 - trihydroxy - 6 - fluoro - 16α - methyl - 1,4,6 - pregnatriene - 3,20 - dione 21 - phosphate.
7. 11β,17α,21 - trihydroxy - 6 - fluoro - 16α - methyl - 1,4,6 - pregnatriene - 3,20 - dione 21 - (tertiary butyl acetate).

References Cited

UNITED STATES PATENTS

| | | | |
|---|---|---|---|
| 2,838,536 | 6/1958 | Magerlein et al. | 260—397.45 |
| 2,877,239 | 3/1959 | Angello et al. | 260—397.4 |
| 2,936,313 | 5/1960 | Elks et al. | 260—397.45 |
| 2,963,498 | 12/1960 | Bergstrom et al. | 260—397.45 |
| 2,997,489 | 8/1961 | Ringold et al. | 260—397.45 |

LEWIS GOTTS, *Primary Examiner.*

L. H. GASTON, M. LIEBMAN, *Examiners.*

G. E. LANDE, H. FRENCH, *Assistant Examiners.*